(12) United States Patent
Haviland

(10) Patent No.: US 6,498,793 B1
(45) Date of Patent: Dec. 24, 2002

(54) METHOD FOR HARDWARE-ASSISTED AUTOMATIC SORTING OF OUT-OF-ORDER PACKETS USING RESTRICTED TRANSACTION LABEL

(75) Inventor: Christopher Martin Haviland, Sacramento, CA (US)

(73) Assignee: Hewlett-Packard Company, Palo Alto, CA (US)

(*) Notice: Subject to any disclaimer, the term of this patent is extended or adjusted under 35 U.S.C. 154(b) by 0 days.

(21) Appl. No.: 09/267,167

(22) Filed: Mar. 12, 1999

(51) Int. Cl.$^7$ ................................................ H04Q 11/04
(52) U.S. Cl. .................... 370/394; 370/395.7; 370/412; 710/3; 710/56
(58) Field of Search ................................ 370/389, 394, 370/395.1, 395.7, 395.71, 395.72, 412, 912; 710/3, 4, 9, 52, 56, 100

(56) References Cited

U.S. PATENT DOCUMENTS 6,157,972 A * 12/2000 Newman et al.
6,243,778 B1 * 6/2001 Fung et al.

FOREIGN PATENT DOCUMENTS

| EP | 0884880 A2 | 12/1998 | ............ H04L/29/06 |
| EP | 098600 A2 | 8/2000 | ............ H04L/29/06 |
| FR | 2766938 | 5/1999 | ............ G06F/13/42 |
| JP | 2000286895 | * 10/2000 | ............ H04L/12/56 |

* cited by examiner

*Primary Examiner*—Douglas Olms
*Assistant Examiner*—Shick Hom

(57) ABSTRACT

A method of receiving a set of data packets which represent a contiguous data block sent over a bus between two nodes. A memory allocation unit allocates memory beginning at a known address to a local node. The local node divides the address into multiple segments that include predetermined transaction label overlay portions. Thereafter, the local node issues request packets which include transaction labels in a header of the request packet that correspond to the predetermined transaction label overlay portions. Subsequently, a remote node sends responses, and a header of the responses includes the transaction label that corresponds to the request. The local node routes response packets to a dedicated context. The dedicated context replaces the transaction label for the transaction label overlay portion to route the response packet to a proper memory location, regardless of the order in which the packet was received.

11 Claims, 1 Drawing Sheet

Figure 1:
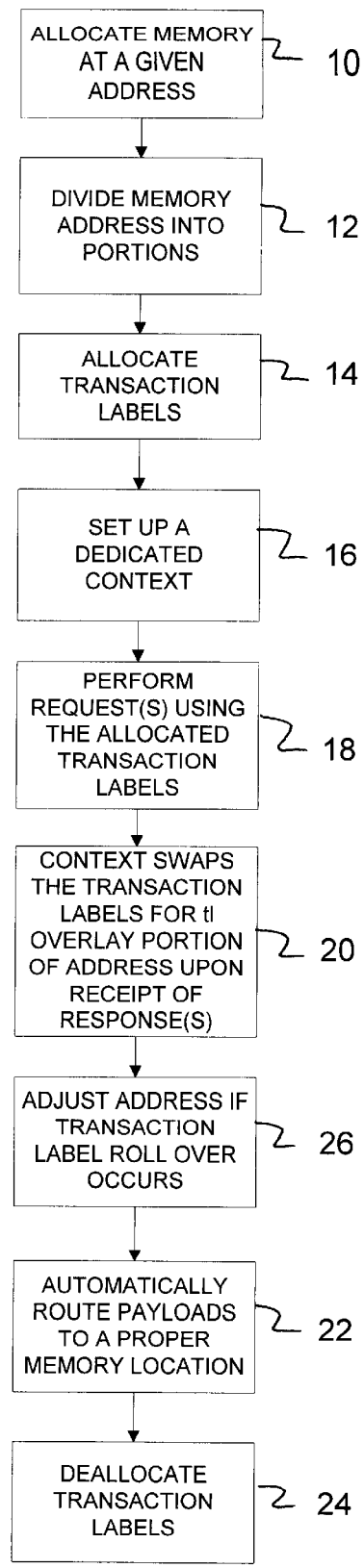

METHOD FOR HARDWARE-ASSISTED AUTOMATIC SORTING OF OUT-OF-ORDER PACKETS USING RESTRICTED TRANSACTION LABEL

The present invention generally relates to networks, and more particularly relates to an exchange of large blocks of contiguous data between nodes on a bus having a limited packet size.

An important function of computer systems is the transfer of data from one node to another. Usually such nodes are connected by a bus over which a sending node transfers data packets to a receiving node. When two nodes on a bus exchange a large block of contiguous data across a bus that only allows packets of a limited size, the sending node must divide the block into a number of smaller packets. A problem exists in that, if these packets are transmitted out of order, a receiving node must put the packets back in order before handing the block of data to a next layer of protocol or to another node.

Known solutions include indexing buffers, storing the data packets into the indexed buffers, and handing the indexed buffers to upper layer protocols one at a time in the proper sequence, regardless of receipt order. A problem is that handing the buffers to the protocol demands large amounts of processor overhead. Another known strategy is to perform memory-to-memory copies of the packets to sort the buffers into the proper order. Such memory-to-memory copies, however, would typically require three memory-to-memory copies for every two packets that need to be swapped. Thus, this method also mandates high processor overhead and consumes a significant amount of memory bandwidth.

Thus, it is an object of the present invention to provide an improved method for conserving processor bandwidth and memory bandwidth during the exchange of large blocks of contiguous data that are divided into a number of order dependent small packets.

Another object of the present invention is to provide such an improved method for eliminating the need for software to sort buffers to reassemble large blocks of contiguous data in which some of the constituent packets were received out of order.

Yet another object of the present invention is to provide such an improved method which utilizes hardware to automatically route data packets to a proper memory location regardless of the order of receipt.

Other objects and advantages will become apparent upon reading the following detailed description, in conjunction with the attached drawings, in which:

FIG. 1 is a flow chart of the preferred embodiment for carrying out the present invention.

DETAILED DESCRIPTION

Broadly stated, the present invention is directed to an improved method adapted to automatically assemble large blocks of contiguous data into the proper order regardless of the order that the packets are received. The present invention utilizes hardware to assemble the data to avoid consuming excessive processor power and bandwidth.

As used herein, a transaction is defined as a request by a local node and the corresponding response by a remote node, if any. The transaction is a protocol data unit of a transaction protocol layer. To keep track of individual transactions when there is more than one transaction outstanding between two nodes at a given time, many communication protocols use a transaction label. The transaction label is, for example, a field in a packet header that identifies particular transactions between two nodes. Thus, the local node making a request tags its request with a transaction label, and the remote node responding to that request tags the response with the same transaction label.

For explanatory purposes, the communication protocol described herein is the IEEE 1394-1995 Standard for a High Performance Serial Bus, and the P1394a Supplement. The 1394 Standard specifies a 6 bit transaction label corresponding to as many as 64 transactions, transactions 0–63. Artisans will appreciate, however, that the invention is not strictly limited to 1394 Standard busses. Other protocols that share certain criteria with the 1394 Standard are used, including protocols in which no two transactions have the same source node, destination node, and transaction label outstanding at any given point in time. Also, a node that receives a request must send the response, if any, using the same transaction label as the request.

The local node of the present invention divides a memory address of a data buffer into three portions: most-significant address bits, a transaction label overlay portion (t1 overlay portion), and least-significant address bits. In this example, the 1394 Standard node includes a byte-addressable system with a 24-bit address bus capable of receiving 1 kilobyte (KB) of payload data per packet. The local node segments the 24 address bits as follows:

| 23 through 16 | 15 through 10 | 9 through 0 |
| --- | --- | --- |
| most-significant bits | t1 overlay portion | least-significant bits |

The number of bits included in each of the three fields is system dependent, and likely programmable. Programming field widths is necessary to accommodate the varying capabilities of maximum packet sizes for the nodes. For example, according to the 1394 Standard the maximum asynchronous packet size at a data speed of 400 megabits per second (Mbit/s) is 2 KB of data, at 200 Mbit/s is 1 KB, and at 100 Mbit/s is 0.5 KB. The number of least-significant bits necessary to accommodate the data is 9 bits for 0.5 KB of data, 10 bits for 1 KB, and 11 bits for 2 KB. Since the local node receives a 1 KB packet in the example, 10 bits, bits 9 through 0, are programmed as the least significant bits. Moreover, since a 6 bit transaction label has been specified, bits 15 through 10 are programmed as the t1 overlay portion of the address, and the remaining bits, bits 23 through 16, are programmed as the most significant bits.

Turning now to FIG. 1, in this example the local node wishes to read a 4 KB block of contiguous data from the remote node on the bus. Before reading the 4 KB block of contiguous data, a memory allocation unit allocates to the local node a 4 KB block of contiguous memory starting at a given address (block 10). For example, the memory allocation unit allocates to the local node a contiguous block of memory beginning at address 0x081020 (0x specifies that the address is in hexadecimal). Since the local node expects 4 KB of data, the local node determines addresses for four given 1 KB buffers beginning at address 0x081020 as follows (block 12):

| 23 through 16 | 15 through 10 | 9 through 0 |
|---|---|---|
| 08 | 04 | 020 |
| 08 | 05 | 020 |
| 08 | 06 | 020 |
| 08 | 07 | 020 |

Notice that the "0" in "04" and the first "0" in "020" are two bit long hexadecimal values because of the way the address is apportioned. After acquiring the four given addresses, the local node uses a transaction label allocation subroutine to allocate transaction labels 04 through 07 (hexadecimal) for requesting node and responding node identifications (block 14). The local node then sets up a dedicated receive context to receive the 4 KB of data from the remote node. This context is dedicated to receive the four response packets and cannot receive any other packets. Preferably, the dedicated context is a direct memory access (DMA) program which artisans will appreciate is hardware that operates upon a list of descriptors that reside in memory. Each descriptor includes a data buffer pointer that points to a memory address. For example, when the dedicated context stores data at memory 0x081020, the data buffer pointer of the descriptor points to 0x081020.

Thereafter, the local node sets the data buffer pointer in the first four descriptors in the dedicated context to address 0x081020 to be modified later by the dedicated context as described below (block 16). Next, the local node performs four read requests to the remote node using transaction labels 04 through 07 consecutively (block 18). The remote node responds to the read requests and utilizes transaction labels 04 through 07 in the packet headers of the corresponding responses.

Upon receipt, the response packets, including the packet header and payload, route to the dedicated context. The dedicated context replaces the transaction label from the packet header of the response for the t1 overlay portion of the address to which the data buffer pointer of the descriptor points (block 20). In this manner, the responses are routed automatically to the proper memory location in the local node, regardless of the order of receipt (block 22). Note that the strategy of the present invention only requires the local node, not the remote node, to have knowledge of the present strategy. After the local node receives all the responses, the previously allocated transaction,labels are deallocated (block 24).

The above solution handles situations in which the t1 overlay portions do not roll over. Roll over is defined as a transaction label progressing from 3F to 00 (hexadecimal) for 6-bit transaction labels. A solution is now discussed for situations in which the transaction label rolls over. Preferably, the method includes the addition of a control field that informs hardware when the transaction label rolls over. Another method for addressing transaction label roll over is for the local node to allocate another block of contiguous memory that does not cause such roll over, and then return to memory the block that causes such roll over. This is not a preferred method, however, since it utilizes more processor overhead than the method now described.

The control field is a register or a field in each descriptor that notifies the dedicated context of rolled over t1 overlay portions of the address. The register is set by firmware, for example, to inform the hardware dedicated context when the most-significant bits of the 24 bit address need to be incremented by one due to the roll over. In this example, a memory allocation unit allocates a 4 KB block of contiguous memory at address 0x08F820. Thus, the four 1 KB buffers which start at address 0x08F820 are given by the following starting addresses:

| 23 through 16 | 15 through 10 | 9 through 0 |
|---|---|---|
| 08 | 3E | 020 |
| 08 | 3F | 020 |
| 09 | 00 | 020 |
| 09 | 01 | 020 |

Note that the t1 overlay portion has rolled over from 3F to 00 and 01. According to the t1 overlay portion of the address, the local node uses the transaction label allocation subroutine to allocate transaction labels 3E through 01 for the requesting and the responding node. Data buffer pointers in the first four descriptors of the dedicated context are set to 0x08F820, and the dedicated context is configured to substitute the transaction labels for the t1 overlay portion of the address. The local node then makes four read requests to the distant node using transaction labels 3E through 01 consecutively. The remote node responds to these requests, and read response packets containing the transaction labels in the header are routed to the dedicated context of the local node.

When the local node receives a response packet, the dedicated context replaces the transaction label from the response packet for the t1 overlay portion of the address. Additionally, the dedicated context checks the control register to determine if it indicates that roll over has occurred, i.e., the dedicated context received a packet with a transaction label 00 or 01. If the dedicated context received a packet with a rolled over transaction label, the dedicated context increments the most-significant bits of the address by one (block 26). Thus, for rolled over transaction labels of 00 and 01, the most-significant bit of the address are incremented from 08 to 09. The data buffer pointer of the dedicated context now points to the proper memory location. In this manner, the read response packets are routed to the proper memory location in the local node, regardless of their order of receipt. After the local node receives all the responses, the previously allocated transaction labels are deallocated (block 24).

From the foregoing description, it should be understood that an improved method has been shown and described which has many desirable attributes and advantages. The present invention automatically assembles large blocks of data into the proper order regardless of receipt order of the constituent packets. Thus, the invention accomplishes the assembly of large blocks contiguous data without consuming excessive processor power and bandwidth.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A method of receiving a set of data packets which represent a contiguous block of data sent over a bus between a local node and a remote node, the method comprising the steps of:

allocating memory beginning at a given address to the local node, said given address including a transaction label overlay portion;

allotting said transaction label overlay portion for given addresses of said memory beginning at said given address;

allocating predetermined transaction labels that correspond to said transaction label overlay portions so that the local node issues request packets with said predetermined transaction labels;

the remote node sending one or more response packets to the local node, each said response packet including a transaction label that corresponds to a transaction label of a request packet; and, the local node creating a modified address by replacing a received transaction label for a transaction label overlay portion of said given address pointing to said allocated memory so that data contained in said response packet is stored at said modified address.

2. A method of receiving a set of data packets which represent a contiguous block of data sent over a bus between a local node and a remote node, the method comprising the steps of:

allocating memory beginning at a given address to the local node, said given address including a transaction label overlay portion;

allotting said transaction label overlay portion for given addresses of said memory beginning at said given address;

allocating predetermined transaction labels that correspond to said transaction label overlay portions so that the local node issues request packets with said predetermined transaction labels;

the remote node sending one or more response packets to the local node, each said response packet including a transaction label that corresponds to a transaction label of a request packet; and, the local node operates to automatically sort incoming packets into said a predetermined order and creates a modified address by replacing a received transaction label for a transaction label overlay portion of said given address pointing to said allocated memory so that data contained in said response packet is stored at said modified address.

3. The method according to claim 1, wherein said predetermined order comprises consecutive addresses of said memory.

4. The method according to claim 1, wherein a dedicated context of said local node performs said step of replacing said transaction label for said transaction label overlay portion of said address.

5. The method according to claim 4, further including the step of incrementing a most-significant bits portion of said address if said dedicated context receives a packet with a rolled over transaction label.

6. The method according to claim 5, wherein said step of incrementation includes utilizing a control register that informs said dedicated context when said most-significant bit portion of said address needs to be incremented.

7. The method according to claim 4, wherein said dedicated context is a direct memory access program.

8. A method of receiving a set of data packets which represent a contiguous block of data sent over a bus between a local node and a remote node, the method comprising the steps of:

allocating memory beginning at a given address to the local node, said given address including a transaction label overlay portion;

allotting said transaction label overlay portion for given addresses of said memory beginning at said given address;

allocating predetermined transaction labels that correspond to said transaction label overlay portions so that the local node issues request packets with said predetermined transaction labels, wherein a transaction label allocation subroutine allocates transaction labels based on requesting and sending node identification numbers;

the remote node sending one or more response packets to the local node, each said response packet including a transaction label that corresponds to a transaction label of a request packet; and, the local node creating a modified address by replacing a received transaction label for a transaction label overlay portion of said given address pointing to said allocated memory so that data contained in said response packet is stored at said modified address.

9. The method according to claim 1, further including the step of deallocating all previously allocated transaction labels when the local node receives all of said response packets.

10. A method for automatically sorting a received set of data packets which represent a contiguous block of data sent over a bus from a remote node to a local node, the method comprising the steps of:

allotting a transaction label overlay portion of one or more addresses that point to memory locations where received data is stored at the local node;

the local node utilizing transaction labels that correspond to said transaction label overlay portions of said addresses to send requests to the remote node;

the remote node sending responses to the local node, said responses including transaction labels of the request to which the responses correspond to; and, storing said response packet in memory after said transaction label of said response packet is replaced for said transaction label overlay portions of said address.

11. A method for automatically sorting a received set of data packets which represent a contiguous block of data sent over a bus from a remote node to a local node, the method comprising the steps of:

allotting a transaction label overlay portion of one or more addresses that point to memory locations where received data packets are is stored at the local node;

the local node utilizing transaction labels that correspond to said transaction label overlay portions of said addresses to send requests to the remote node;

the remote node sending responses including data packets to the local node, said responses data packets including said transaction labels of said corresponding request;

incrementing a most-significant bits portion of an address if said dedicated context receives a response data packet with a rolled over transaction label; and, storing said response packet in memory after transaction label of said response packet is replaced for said transaction label overlay portions of said address and said most-significant bit is incremented if necessary.

* * * * *

UNITED STATES PATENT AND TRADEMARK OFFICE
CERTIFICATE OF CORRECTION

PATENT NO. : 6,498,793 B1
DATED : December 24, 2002
INVENTOR(S) : Christopher Martin Haviland It is certified that error appears in the above-identified patent and that said Letters Patent is hereby corrected as shown below:

Column 5,
Line 41, after "into" delete -- said --

Column 6,
Line 51, after "are" delete "is"
Line 53, delete "portions" and insert therefor -- portion --
Lines 55 and 56, delete "responses" and insert therefor -- response --.

Signed and Sealed this

Twenty-second Day of March, 2005

JON W. DUDAS
*Director of the United States Patent and Trademark Office*